United States Patent
Kuelbs et al.

(10) Patent No.: US 8,129,850 B2
(45) Date of Patent: Mar. 6, 2012

(54) SOLAR WIND CHIME

(75) Inventors: Gregory G. Kuelbs, Westlake, TX (US); Gustav P. Kuelbs, Grapevine, TX (US)

(73) Assignee: World Factory, Inc., Westlake, TX (US)

( * ) Notice: Subject to any disclaimer, the term of this patent is extended or adjusted under 35 U.S.C. 154(b) by 591 days.

(21) Appl. No.: 12/355,430

(22) Filed: Jan. 16, 2009

(65) Prior Publication Data

US 2010/0253090 A1     Oct. 7, 2010

Related U.S. Application Data

(63) Continuation-in-part of application No. 12/049,936, filed on Mar. 17, 2008, now Pat. No. 7,518,253.

(51) Int. Cl.
*F02B 63/04* (2006.01)
*F03G 7/08* (2006.01)

(52) U.S. Cl. ............ 290/1 R; 60/641.12; 323/906

(58) Field of Classification Search ........... 290/1 R; 60/641.12, 641.11; 340/392.2, 392.5, 326, 340/392.4; 362/253, 192, 314, 605; 84/402, 84/404; 323/906
See application file for complete search history.

(56) References Cited

U.S. PATENT DOCUMENTS

| | | | |
|---|---|---|---|
| 4,387,999 A | 6/1983 | Shelley | |
| 4,702,140 A | 10/1987 | Goldfarb | |
| 4,854,214 A * | 8/1989 | Lowe | 84/404 |
| 5,208,578 A * | 5/1993 | Tury et al. | 340/392.2 |
| 5,369,391 A | 11/1994 | Gadsby | |
| 5,378,512 A * | 1/1995 | Van Wyk | 428/11 |
| 5,560,101 A * | 10/1996 | Sandell et al. | 29/868 |
| 5,587,697 A | 12/1996 | Rent | |
| 6,124,782 A | 9/2000 | Kraft, Sr. | |
| 6,166,660 A | 12/2000 | Grenier | |
| 6,441,284 B1 | 8/2002 | Greene | |
| 7,336,157 B2 | 2/2008 | Richmond | |
| 7,341,360 B2 * | 3/2008 | Richmond et al. | 362/240 |
| 7,345,371 B1 * | 3/2008 | Kuelbs | 290/1 R |
| 7,448,347 B2 | 11/2008 | Richmond | |
| 7,518,253 B2 * | 4/2009 | Kuelbs | 290/1 R |
| 2002/0180404 A1 | 12/2002 | Benn et al. | |
| 2004/0100802 A1 * | 5/2004 | Chang | 362/430 |
| 2004/0218396 A1 * | 11/2004 | Garber et al. | 362/432 |
| 2005/0040785 A1 | 2/2005 | Barnes et al. | |
| 2005/0279403 A1 | 12/2005 | Kube | |
| 2006/0187656 A1 * | 8/2006 | Kuelbs et al. | 362/183 |
| 2006/0227542 A1 | 10/2006 | Richmond | |
| 2007/0019404 A1 | 1/2007 | Chen | |
| 2008/0291665 A1 * | 11/2008 | Wijaya et al. | 362/183 |

FOREIGN PATENT DOCUMENTS

JP     03139698 A     6/1991

* cited by examiner

*Primary Examiner* — Julio Gonzalez
(74) *Attorney, Agent, or Firm* — James E. Walton

(57) ABSTRACT

A solar wind chime having a structure that supports a solar energy system, a electrical subsystem, a cage, and a chime. The solar energy system includes a rechargeable electrical power source conductively coupled to a solar energy collection system. The rechargeable electrical power source powers one or more electrical subsystems. The electrical subsystem having at least one light for illuminating the solar wind chime. The cage is configured for protecting an ornamental object. The chime includes a bracket disposed within the chime. A wire extends through the chime and is at least partially supported by the bracket.

19 Claims, 12 Drawing Sheets

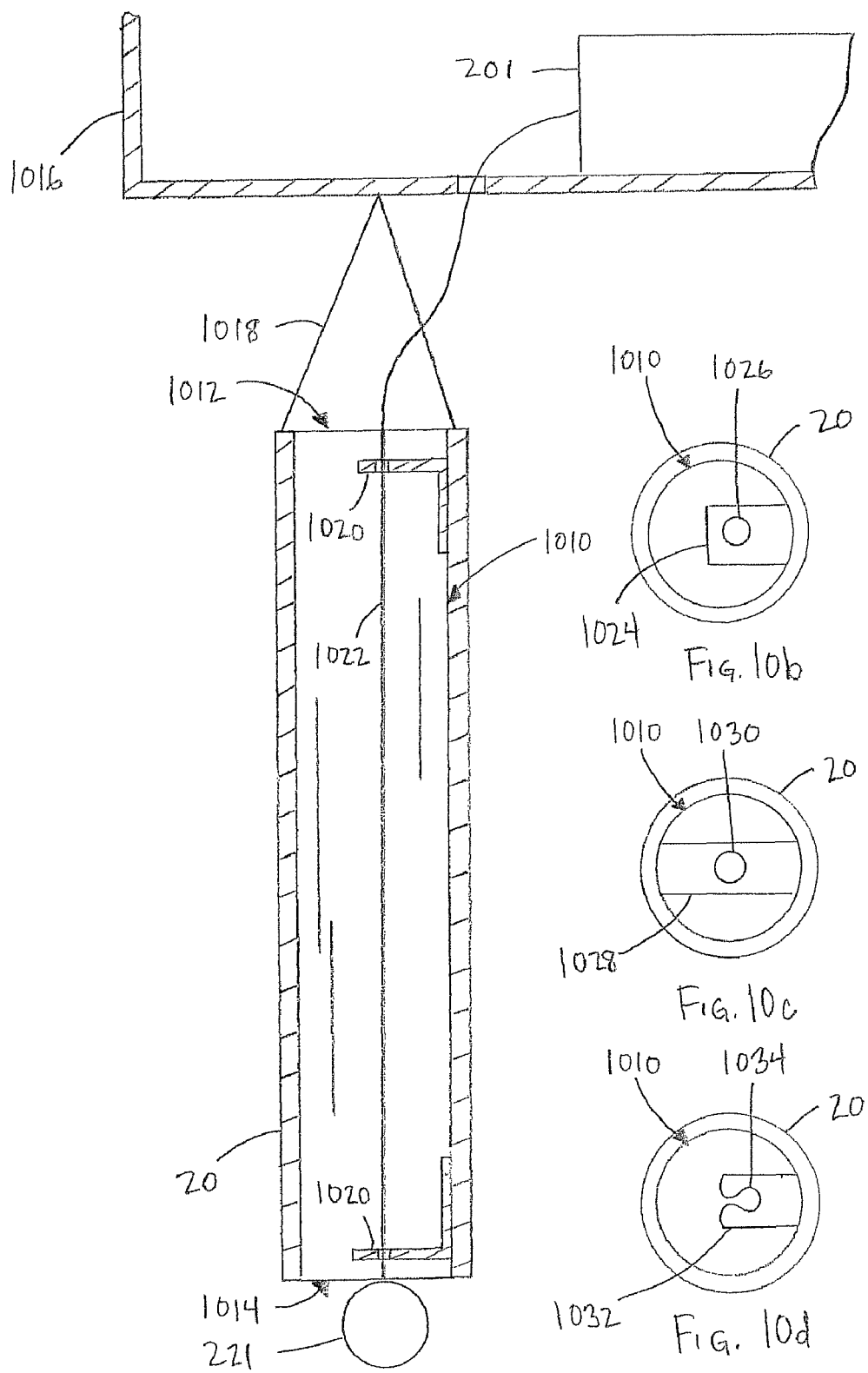

SOLAR WIND CHIME

CROSS REFERENCE TO RELATED APPLICATIONS

This application is a continuation-in-part of U.S. application Ser. No. 12/049,936, filed 17 Mar. 2008, titled "Solar Wind Chime," which is hereby incorporated by reference for all purposes as if fully set forth herein, and which claims the benefit of U.S. application Ser. No. 11/224,212, filed 12 Sep. 2005, titled "Solar Wind Chime," which is hereby incorporated by reference for all purposes as if fully set forth herein, and which claims the benefit of U.S. Provisional Application No. 60/672,793, filed 19 Apr. 2005, titled "Solar Wind Chime," and U.S. Provisional Application No. 60/649,630, filed 2 Feb. 2005, titled "Solar Wind Chime," both of which are hereby incorporated by reference for all purposes as if fully set forth herein.

BACKGROUND

1. Field of the Invention

The present application relates in general to the field of wind chimes.

2. Description of Related Art

There are many designs of wind chimes well known in the art. Wind chimes are typically used outdoors; however, some wind chimes are used indoors or outdoors in an area that is protected from the environment. At night, or in otherwise poorly illuminated locations, it is difficult to visually inspect a wind chime or fully appreciate the decorative nature of a wind chime. While there are many wind chimes well known in the art, considerable room for improvement remains.

BRIEF DESCRIPTION OF THE DRAWINGS

For a more complete understanding of the present application, including its features and advantages, reference is now made to the detailed description of the invention taken in conjunction with the accompanying drawings in which like numerals identify like parts, and in which:

FIG. 10a is a cut-out, enlarged view of a chime of the solar wind chime; and

FIGS. 10b-d are enlarged top views of the chime of the solar wind chime.

DETAILED DESCRIPTION OF THE DRAWINGS

Figure 1A:
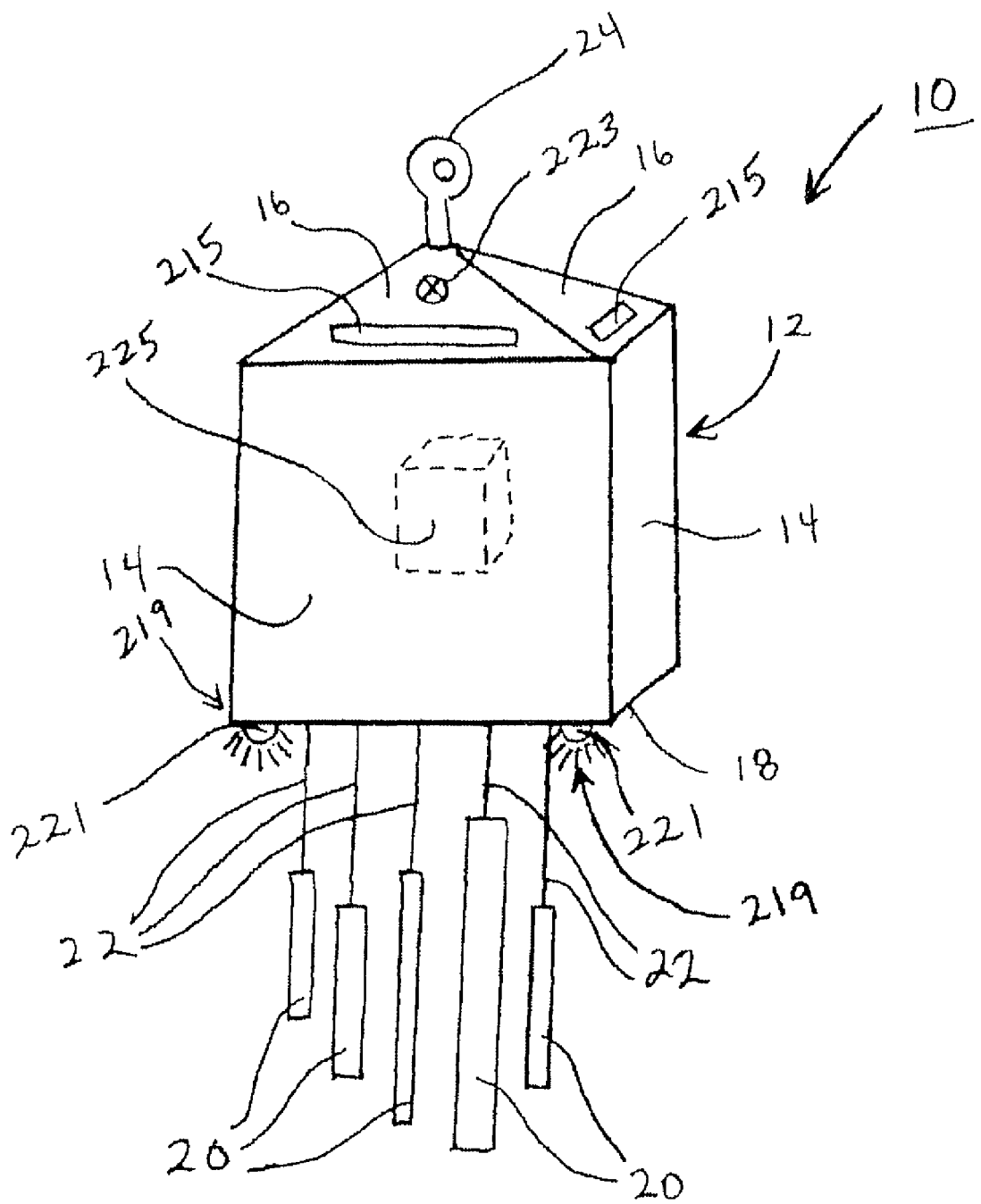
FIG. 1A is an oblique view of a solar wind chime according to the present application.

Referring to FIG. 1A in the drawings, the preferred embodiment of a solar wind chime 10 according to the present application is illustrated. Solar wind chime 10 preferably comprises a body 12, body 12 comprising side faces 14, top faces 16, and a bottom face 18. Solar wind chime 10 further comprises chimes 20 attached to bottom face 18 with strings 22. It should be appreciated that while solar wind chime 10 is illustrated as comprising chimes 20, solar wind chime may alternatively comprise other hanging accessories, decorative elements, or devices in combination with or in place of chimes 20 (see FIGS. 3-6). Solar wind chime 10 preferably comprises a hanger 24 attached to an upper part of body 12. Solar wind chime 10 further comprises an enclosure 225 and a solar energy system 201 (see FIG. 2).

Solar wind chime 10 is preferably suspended from a support structure (not shown) by attaching hanger 24 to the support structure. Hanger 24 is preferably an eyebolt adapted for suspending solar wind chime 10 from a support structure; however, hanger 24 may alternatively be a clasp, hook, or other suitable device or apparatus. It should be appreciated that while body 12 is preferably substantially box shaped, body 12 may alternatively form other geometric shapes or be irregular in shape. Body 12 is preferably constructed of a weatherproof plastic but may alternatively be constructed of metal, wood, glass, or other suitable materials. Chimes 20 are preferably constructed of metal tubing, but may alternatively be constructed of wood, plastic, or other suitable material. Further, chimes 20 may not be tubular in nature but instead may comprise solid members. It should be appreciated that alternative embodiments of solar wind chime 10 may optionally comprise a supporting structure adapted for vertically supporting the wind chime.

Figure 1B:
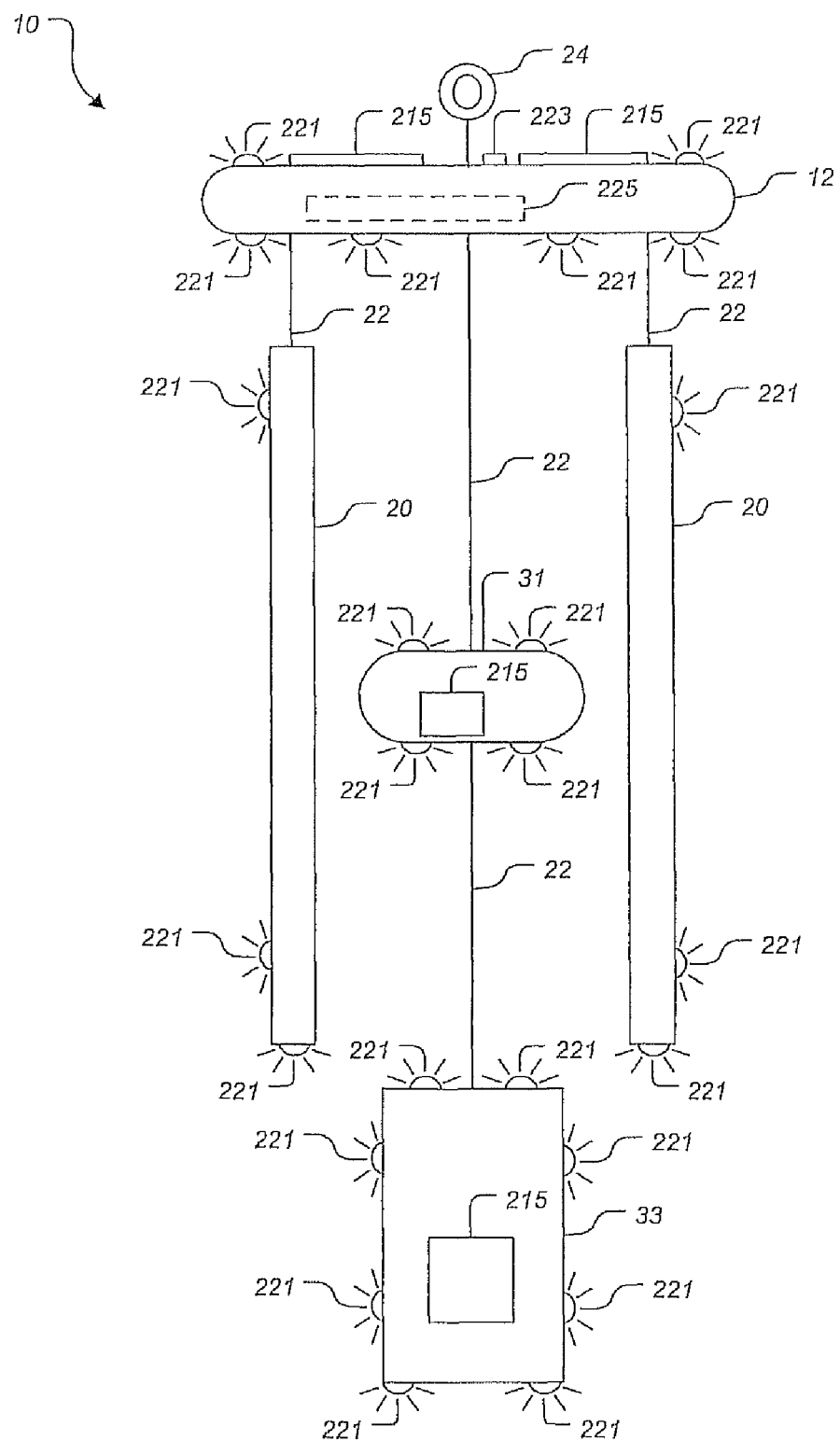
FIG. 1B is a front view of an alternative embodiment of the solar wind chime.

Referring to FIG. 1B in the drawings, a preferred embodiment of a solar wind chime 10 according to the present application is illustrated. Solar wind chime 10 preferably comprises a body 12, body 12 comprising side faces, top faces, and a bottom face. Solar wind chime 10 further comprises chimes 20, striker 31, and pendulum 33 attached to the bottom face of body 12 with strings 22. Solar wind chime 10 preferably comprises a hanger 24 attached to an upper part of body 12. Solar wind chime 10 further comprises an enclosure 225 and a solar energy system 201 (see FIG. 2).

Solar wind chime 10 further comprises a plurality of lighting elements 221 conductively coupled to solar energy system 201, as shown and described below in FIG. 2. The plurality of lighting elements 221 may for example attach to any portion of body 12, any portion of chimes 20, any portion of striker 31, or any portion of pendulum 33. In addition or as an alternative, solar wind chime 10 further comprises a plurality of solar collectors 215 and photo cells 223, as described in more detail in FIG. 2. Solar collectors 215 may for example attach to any portion of body 12, any portion of chimes 20, any portion of striker 31, or any portion of pendulum 33.

Figure 1C:
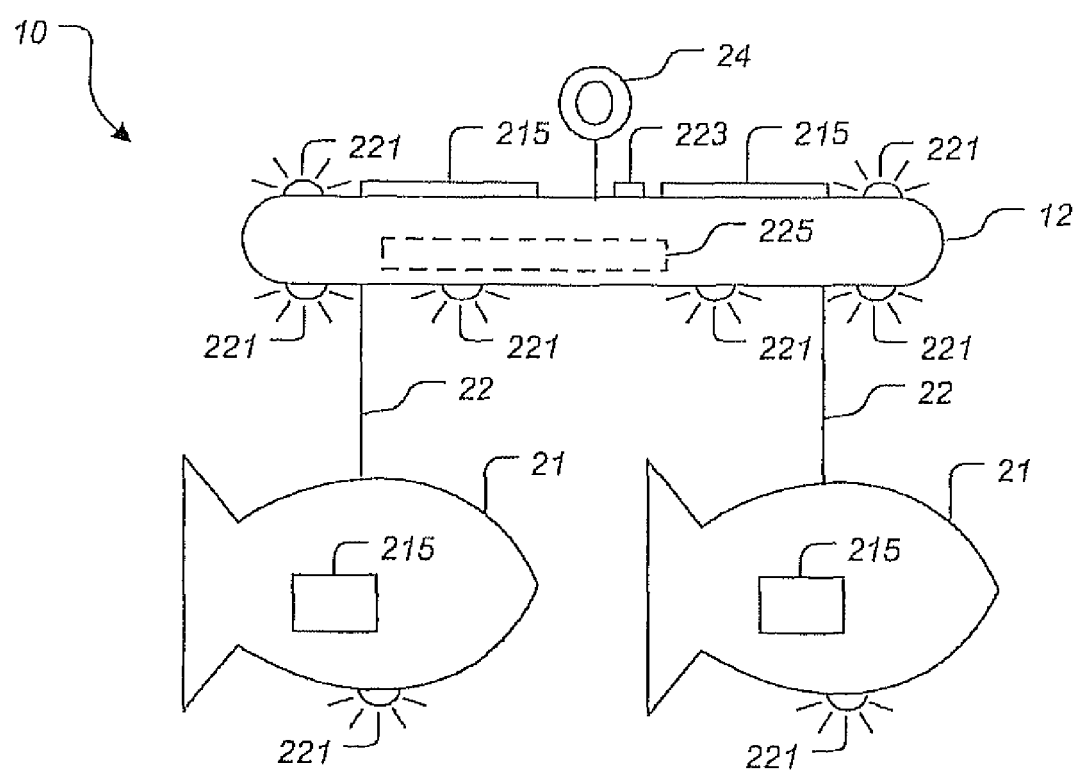
FIG. 1C is a front view of an alternative embodiment of the solar wind chime.

Referring to FIG. 1C in the drawings, a preferred embodiment of a solar wind chime 10 according to the present application is illustrated. Solar wind chime 10 preferably comprises a body 12, body 12 comprising side faces, top faces, and a bottom face. Solar wind chime 10 further comprises mobile elements 21 attached to the bottom face of body 12 with strings 22. Solar wind chime 10 preferably comprises a hanger 24 attached to an upper part of body 12. Solar wind chime 10 further comprises an enclosure 225 and a solar energy system 201 (see FIG. 2).

Solar wind chime 10 further comprises a plurality of lighting elements 221 conductively coupled to solar energy system 201, as shown and described below in FIG. 2. The plurality of lighting elements 221 may for example attach to any portion of body 12 or any portion of mobile elements 21. In addition or as an alternative, solar wind chime 10 further comprises a plurality of solar collectors 215 and photo cells 223, as described in more detail in FIG. 2. Solar collectors 215 may for example attach to any portion of body 12 or any portion of mobile elements 21.

Figure 2:
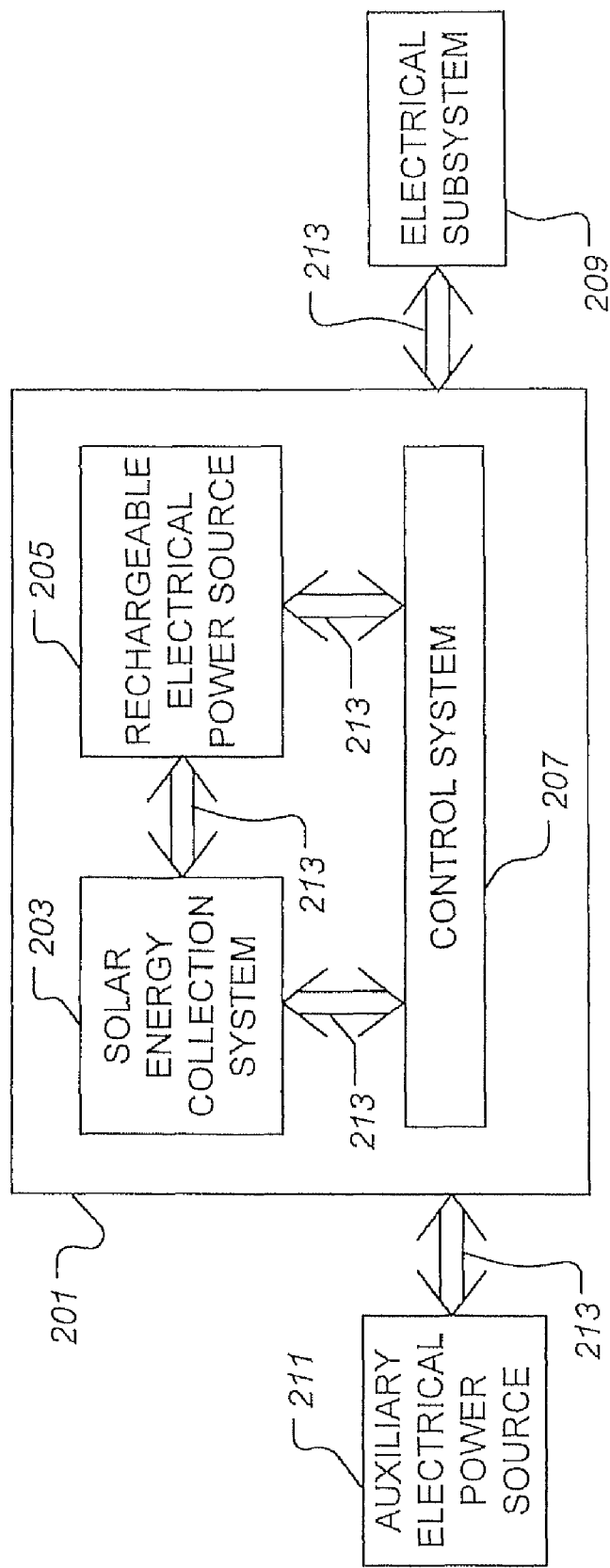
FIG. 2 is a high level schematic of the solar energy system of the solar wind chime.

Now referring to FIG. 2, the preferred embodiment of solar energy system 201 according to the present application is illustrated. Solar energy system 201 preferably comprises a solar energy collection system 203, a rechargeable electrical power source 205, and a control system 207. Solar energy system 201 is preferably conductively coupled to an electrical subsystem 209. Solar energy system 201 may optionally be conductively coupled to an auxiliary electrical power source 211. Conductive coupling is preferably achieved through the use of electrical conductors 213 such as insulated copper wires, circuit boards, or other suitable devices or means for conductively coupling electrical components.

Solar energy collection system 203 preferably comprises a solar collector 215 (see FIG. 1) and other necessary circuitry for receiving and collecting solar energy and converting the solar energy into electrical energy. Solar energy collection system 203 is preferably conductively coupled to both rechargeable electrical power source 205 and control system 207 with electrical conductors 213. Rechargeable electrical power source 205 preferably comprises a rechargeable battery for storing electrical energy; however, rechargeable electrical power source 205 may alternatively comprise any rechargeable electrical power storage device, such as a capacitor, battery pack, any other suitable device for storing electrical energy, or combination thereof. Rechargeable electrical power source 205 is preferably conductively coupled to solar energy collection system 203 and control system 207 with electrical conductors 213.

The purpose of solar energy system 201 is preferably to convert solar energy into electrical energy and to supply that electrical energy to one or more electrical subsystems 209. In operation, solar energy collection system 203 preferably converts solar energy into electrical energy. Solar energy collection system 203 preferably delivers electrical energy to rechargeable electrical power source 205 to provide a trickle charge to rechargeable electrical power source 205. However, when rechargeable electrical power source 205 is fully charged, solar energy collection system 203 preferably delivers electrical energy to control system 207 where the electrical energy is preferably diverted for uses other than charging rechargeable electrical power source 205. For example, the electrical energy can be used to directly power electrical subsystem 209 rather than electrical subsystem 209 consuming power from rechargeable electrical power source 205.

Auxiliary electrical power source 211 preferably comprises an alternating current power source such as power from a conventional AC outlet; however, auxiliary electrical power source 211 may alternatively comprise a direct current power source such as a non-rechargeable battery, one or more fuel cells, a renewable energy source such as a wind powered generator, a rechargeable battery pack (in which the battery pack is removed, recharged remotely, and thereafter replaced back into auxiliary electrical power source 211), or any other electrical power source suitable for providing solar energy system 201 with additional electrical energy. Of course, the foregoing configuration allows for the interchanging, or swapping, of battery packs. Auxiliary electrical power source 211 is preferably conductively coupled to solar energy system 201 and preferably delivers electrical energy to control system 207. Auxiliary electrical power source 211 preferably supplies electrical energy for a variety of uses including: powering electrical subsystem 209, recharging rechargeable electrical power source 205, and powering other solar energy system 201 circuitry such as control system 207.

Alternative embodiments of solar energy system 201 may not include the solar energy collection system 203. Instead, solar energy system 201 may comprise a circuit for powering electrical subsystem 209 operable only by electrical energy supplied by auxiliary electrical power source 211.

Control system 207 preferably comprises circuitry, microprocessors, memory devices, sensors, switches, and other electronic components necessary to: partially or fully direct electrical energy from solar energy collection system 203 to rechargeable electrical power source 205, fully or partially direct electrical energy from solar energy collection system 203 to electrical subsystem 209, allow a user to manually switch solar energy system 201 on and off, receive input to alter or control the performance of the recharging of rechargeable electrical power source 205 and/or the supply of electrical energy to electrical subsystems 209, control the performance of electrical subsystems 209, fully or partially charge rechargeable electrical power source 205 with electrical energy supplied by auxiliary electrical power source 211, and fully or partially power electrical subsystem 209 with electrical energy from auxiliary power source 211.

It should be appreciated that while solar energy system 201 comprises control system 207 in this preferred embodiment, simpler and less sophisticated embodiments of solar energy system 201 are possible. For example, solar energy system 201 may not comprise control system 207, but merely comprise solar energy collection system 203 and rechargeable electrical power source 205 conductively coupled to each other with electrical conductors 213.

As illustrated in FIG. 1, electrical subsystem 209 is preferably a lighting subsystem 219 for providing illumination. Lighting subsystem 219 preferably comprises lighting elements 221 conductively coupled to solar energy system 201. Lighting elements 221 are preferably light emitting diodes (LED's), but may be organic light emitting diodes, incandescent bulbs, cold cathode ray tubes, fluorescent lights, or any other suitable electrical lighting apparatus, or combination thereof. It should be appreciated that the electrical subsystem 209 of alternate embodiments of the present application may be a water pumping subsystem, sound subsystem, video subsystem, microphone subsystem, receiving and transmitting subsystem, motion actuating subsystem, cooling subsystem, heating subsystem, raising and lowering subsystem, water agitation subsystem, electrical motor subsystem, any other electrically powered subsystem, or combination thereof.

A translucent shield, a lens, reflector, light fixture, or a combination of these may optionally be attached to or operably associated with lighting subsystem 219 to enhance or alter the illumination provided by lighting elements 221. The optional shields, lenses, reflectors, and fixtures may also be configured to prevent water, dirt, or other particulate matter from interfering with the operation of lighting elements 221. Further, it should be appreciated that the optional shields, lenses, reflectors, and fixtures may be incorporated into any embodiment of the present application.

It should be appreciated that lighting subsystem 219 and control system 207 may include selected components, circuitry, and microprocessor control chips to produce a variety of optional features. For example, optional features may include: manual lighting intensity controls, blinking lights, fading lights, changing the light color, motion activated lighting, sound activated lighting, a wide variety of lighting sequence or motion effects, and any other appropriate lighting effects or interactive means for controlling lighting effects. Of course, any components, circuitry, microprocessor control chips, or other means of controlling or altering the functionality of electrical subsystem 209 would be conductively coupled to solar energy system 201, electrical subsystem 209, and/or auxiliary electrical power source 211. Further, where electrical subsystem 209 is not a lighting subsystem 219, it should be appreciated that similar controls, programming capabilities, interactive input devices, and other electrical subsystem 209 performance controls or alteration means may be incorporated into the electrical subsystem 209 and/or the associated control system 207.

A photo resistor, or photo cell 223 (see FIG. 1), is preferably incorporated into the preferred embodiment of control system 207. Photo cell 223 detects the presence of light and controls whether lighting elements 221 provide illumination, by switching lighting elements 221 on or off, or by regulating the intensity of light provided by lighting elements 221. For example, when photo cell 223 detects a substantial amount of light, lighting elements 221 are switched off and provide no illumination. However, when photo cell 223 detects a low level of light, lighting elements 221 are switched on and provide illumination. Alternatively, photo cell 223 may be used to dim or brighten the output of lighting elements 221. In addition, one or more on-off switches or buttons may be incorporated into control system 207 to facilitate the operation of solar energy system 201, or to vary the operation and control of solar energy system 201, auxiliary electrical power source 211, or electrical subsystem 209. It will be appreciated that the operation of solar energy system 201, auxiliary electrical power source 211, and electrical subsystem 209 may be controlled remotely by infrared light, radio wave, or other types of transmitters and receivers.

It should be appreciated that solar energy system 201 may further comprise or be conductively coupled to a connection port for conveniently interfacing solar energy system 201 with other components, systems, subsystems, or any other suitable devices. The connection port is preferably conductively coupled with control system 207; however, connection port may alternatively be conductively coupled to any other component of solar energy system 201, auxiliary electrical power source 211, or electrical subsystem 209. More specifically, connection ports may be adapted to interface with electrical devices electrical devices having power plugs compatible with the connection port. Connection ports would be a great convenience because electrical devices such as lights, fans, radios, or other suitable electrical devices can be supplied power or controlled by solar energy system when connected to the connection port.

Components of solar energy system 201, auxiliary electrical power source 211, and electrical subsystem 209 may be located substantially near each other. For example, in the preferred embodiment, with the exceptions of solar collectors 215, photo cell 223, and lighting elements 221, much of the circuitry of solar energy system 201, auxiliary electrical power source 211, and electrical subsystem 209 is preferably substantially housed within an enclosure 225 (see FIG. 1). It should be appreciated that the components of solar energy system 201, auxiliary electrical power source 211, and electrical subsystem 209 are preferably substantially protected such that water, dirt, and other matter is prevented from interfering with the operation of solar energy system 201, auxiliary electrical power source 211, and electrical subsystem 209. It should also be appreciated that in alternative embodiments, components of solar energy system 201, auxiliary electrical power source 211, and electrical subsystem 209 may not be housed in enclosure 225 and may be located substantial distances from each other while remaining conductively coupled. For example, an alternative embodiment of the present application may be configured such that solar collector 215 is located on a home rooftop and is conductively coupled to rechargeable electrical power source 205, other components, systems, and/or subsystems which are located a significant distance away from solar collector 215, such as near the ground level of the home.

It should be appreciated that enclosure 225 may alternatively be adapted to carry all or substantially all of the components of solar energy system 201, electrical subsystem 209, and auxiliary electrical power source 211. In alternative embodiments of the present application, enclosure 225 may be shaped and adapted for easy connection to and disconnection from the structure supporting enclosure 225. For example, an embodiment of enclosure 225 may allow enclosure 225 to be removably attached to the structure supporting enclosure 225, subsequently detached from the structure, and later removably attached to a different supporting structure. Alternatively, enclosure 225 may be integrally or sealably attached to a supporting structure. For example, enclosure 225 may be attached such that it passes through a hole in a supporting structure and forms a watertight seal with that hole. It should be appreciated that in alternative embodiments where the enclosure carries the entire solar energy system and/or other circuitry or systems, the enclosure may be inset, inlaid, or disposed in a recessed space of the supporting structure. For example, side faces 14, top faces 16, and bottom face 18 may have a space cut out for fully or partially receiving the enclosure whereby lighting elements may illuminate solar wind chime 10 system from a recessed area of side faces 14, top faces 16, and/or bottom face 18. Further, enclosure 225 may alternatively be attached to different types of structures or embodiments of the present application suitable for supporting or carrying enclosure 225.

Components of solar energy system 201, auxiliary electrical power source 211, and electrical subsystem 209 may be located and/or operably associated with various locations on each embodiment of solar wind chime, including in body 12, side faces 14, top faces 16, bottom face 18, chimes 20, strings 22, and hanger 24. Additionally, components of solar energy system 201, auxiliary electrical power source 211, and electrical subsystem 209 systems may be located remote from and even significantly distant from each wind chime. Enclosure 225 is preferably located within body 12 in a hollow portion of body 12 between side faces 14, top faces 16, and bottom face 18; however, it should be appreciated that in some embodiments of the present application, one or more components of solar energy system 201 may be located remote from the hollow portion of body 12. In addition or as an alternative, enclosure 225 may be attached in a hollow portion of striker 31, on pendulum 33, or in chimes 20.

Solar collector 215 may be located at any suitable location on or about solar wind chime 10 or remote from solar wind chime 10; however, it is preferred that solar collector 215 be optimally exposed to solar light. Solar collector 215 is preferably attached to top face 16, but may alternately be located remote from top face 16. For those applications in which solar wind chime 10 is primarily a decorative piece displayed indoors, it may be desirable to locate solar collector 215 at a location on solar wind chime 10 that is near or faces a window, or at a location remote from solar wind chime 10 where the remote location may have different ambient lighting conditions. For example, if solar wind chime 10 is located indoors with low levels of light available for conversion to electrical energy by solar collector 215, solar collector 215 may be located outdoors to expose solar collector 215 to more light. It should be understood that sufficiently long electrical conductors 213 are incorporated to achieve remote placement of solar collectors 215 and other remotely located electrical components. For similar reasons, photo cell 223 is also preferably attached to top face 16, but may alternately be located remote from top face 16. In addition or as an alternative, solar collector 215 may be attached to pendulum 33 (see FIG. 1B).

Lighting elements 221 are preferably attached to bottom face 18. Lighting elements 221 may also optionally be operably associated with side faces 14, top faces 16, chimes 20 (or other hanging accessories, hanging decorative elements, or hanging devices in combination with or in place of chimes 20), strings 22, and/or hanger 24. Lighting elements 221 preferably illuminate solar wind chime 10 and/or the space in and around solar wind chime 10. Specifically, lighting elements 221 are preferably connected to bottom face 18 and arranged to illuminate solar wind chime 10 in a manner such that chimes 20 and the area below bottom face 18 are substantially illuminated. It should be appreciated that lighting elements 221 may alternatively be located remote from solar wind chime 10 such that lighting elements 221 provide illumination to spaces significantly remote from solar wind chime 10. For example, multiple lighting elements 221 may be located remote from solar wind chime 10 so that the remotely located lighting elements 221 illuminate a path or walkway leading to solar wind chime 10.

It should be appreciated that solar wind chime 10 may alternatively be constructed of optically conductive material such as glass or a translucent plastic. Where an element of solar wind chime 10 is constructed of an optically conductive material, lighting elements 221 may be located within the translucent element such as side face 14, top face 16, bottom face 18, chime 20, string 22, or hanger 24, thereby optionally creating a glowing illumination effect.

In alternative embodiments, multiple lighting elements may be located on or about solar wind chime 10. The multiple lighting elements may be arranged in a manner such that the lighting elements illuminate with strips of illumination. Further, alternate embodiments of solar wind chime 10 may include more than one solar energy system to independently power multiple lighting elements.

Figure 3:
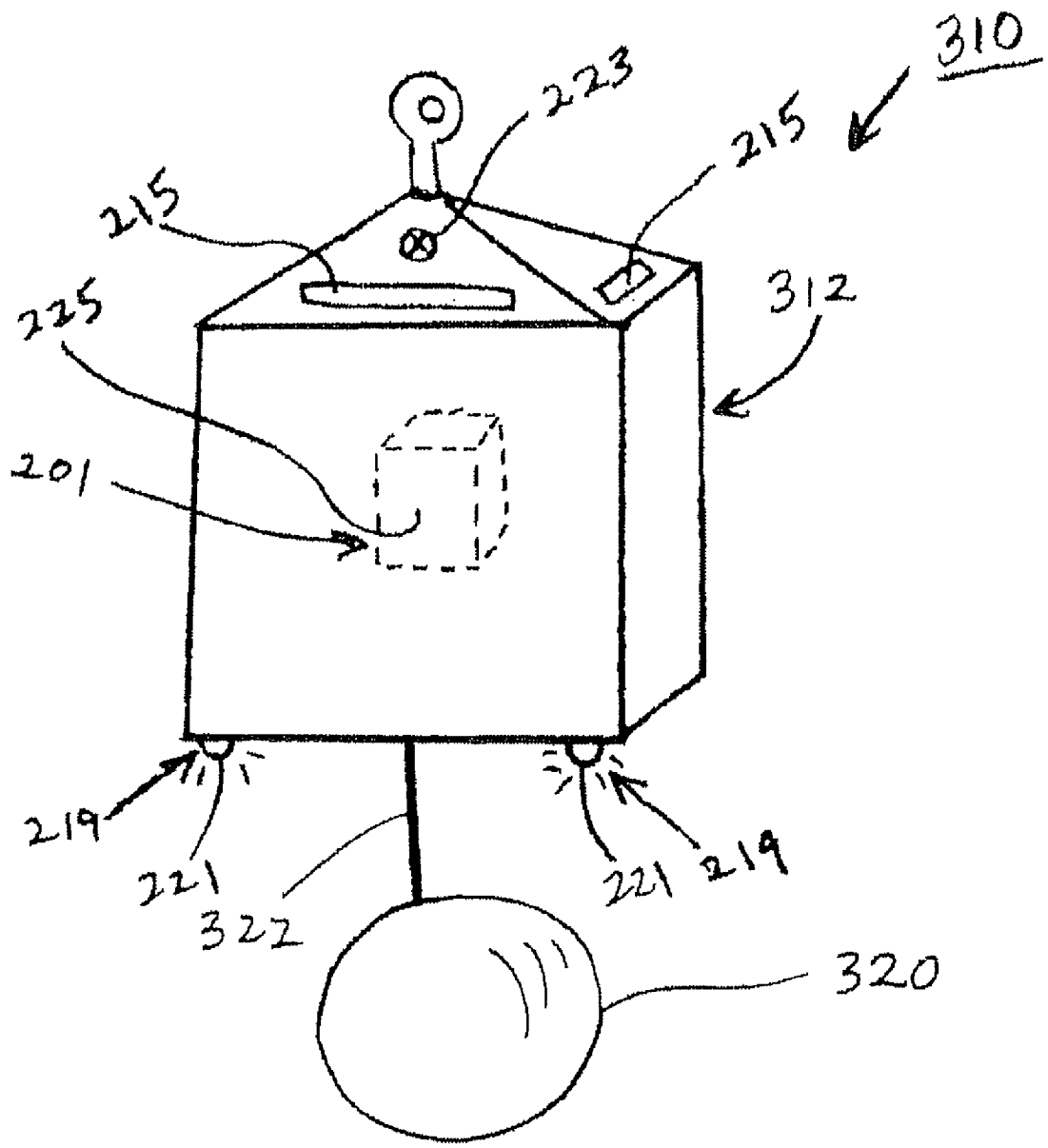
FIG. 3 is an oblique view of an alternate embodiment of the solar wind chime.

Referring now to FIG. 3 in the drawings, an alternate embodiment of the solar wind chime 10 is illustrated. Solar wind chime 310 is similar to solar wind chime 10 and includes a body 312 substantially similar to body 12 in form and function. Solar wind chime 310 also includes solar energy system 201 and lighting subsystem 219. As illustrated, the elements of solar energy system 201 and lighting subsystem 219 are located on body 412 in substantially the same manner as they are attached to body 12. However, solar wind chime 10 does not include chimes 20, but instead, solar wind chime 310 includes a decorative gazing ball 320 hung from body 312 by a string 322. Gazing ball 320 is illustrated as a ball having a smooth silver mirrored finish. Of course, gazing ball 320 may be attached to string 322 in a myriad of ways, but as illustrated, gazing ball 320 is attached at one end of string 322. It should be appreciated that string 322 may alternatively be replaced with any other appropriate means for attaching decorative elements such as gazing ball 320 to body 312. For example, a weaved or knotted hemp feature may be adapted for attachment to body 312 and to carry gazing ball 320.

Figure 4:
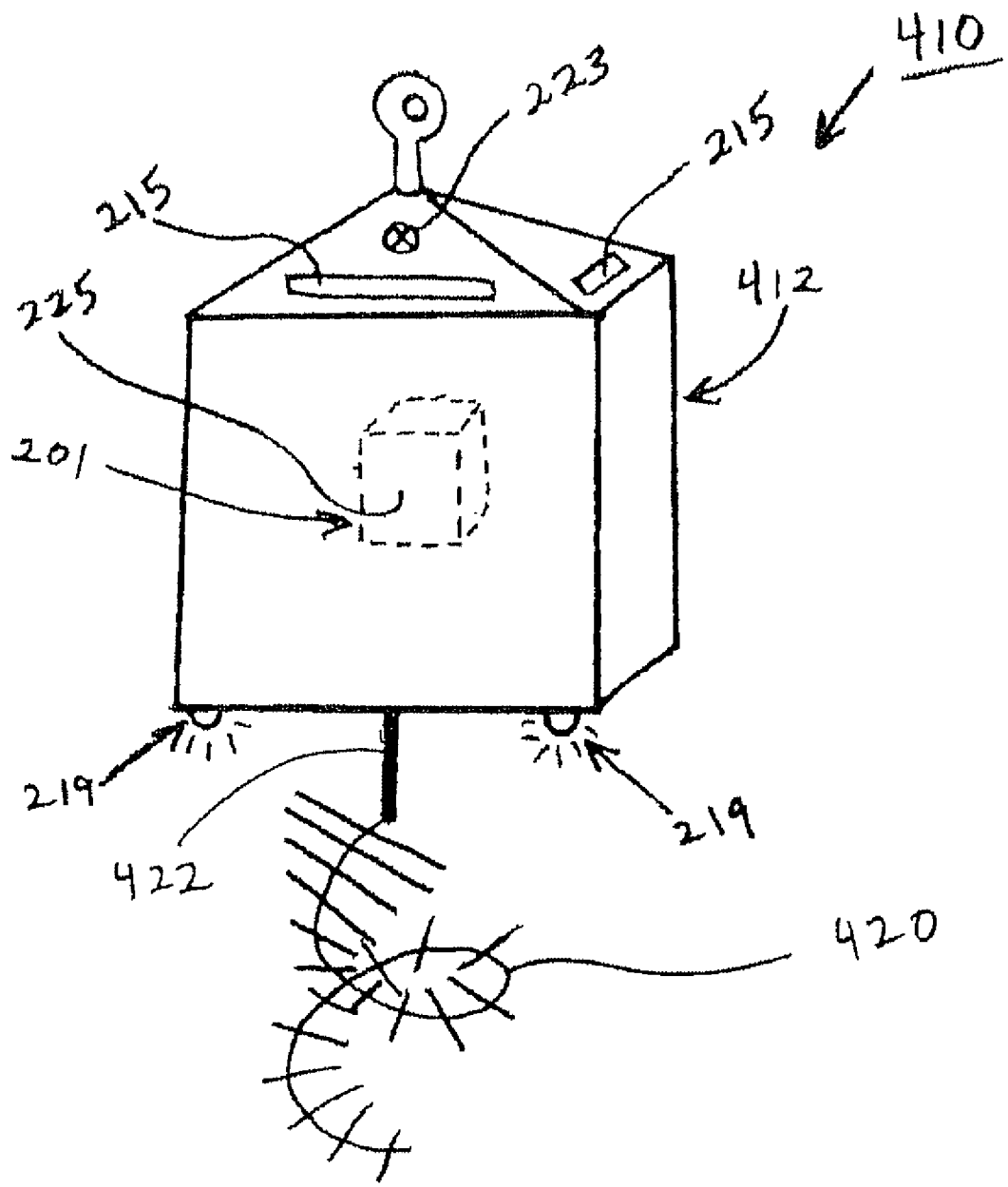
FIG. 4 is an oblique view of an alternate embodiment of the solar wind chime.

Referring now to FIG. 4 in the drawings, an alternate embodiment of the solar wind chime 10 is illustrated. Solar wind chime 410 is similar to solar wind chime 10 and includes a body 412 substantially similar to body 12 in form and function. Solar wind chime 310 also includes solar energy system 201 and lighting subsystem 219. As illustrated, the elements of solar energy system 201 and lighting subsystem 219 are located on body 412 in substantially the same manner as they are attached to body 12. However, solar wind chime 10 does not include chimes 20, but instead, solar wind chime 410 includes a decorative helical feature 420 hung from body 412 by string 422. Helical feature 420 is illustrated as being constructed of a single metal spiral element having discrete metal elements tangentially attached to the spiral element.

Figure 5:
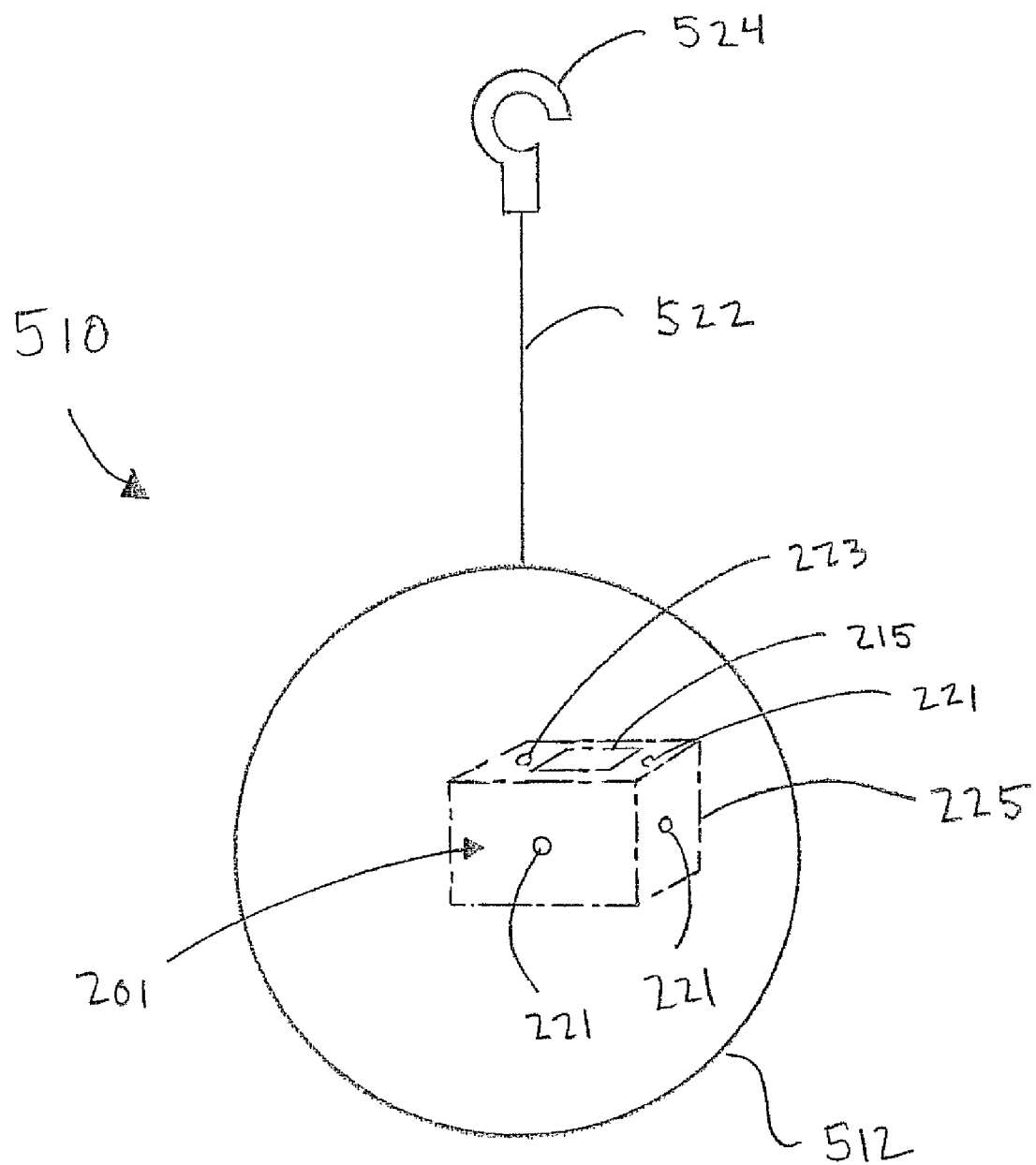
FIG. 5 is an oblique view of an alternate embodiment of the solar wind chime.

Referring now to FIG. 5 in the drawings, an alternate embodiment of the solar wind chime 10 is illustrated. Solar wind chime 510 comprising a translucent spherical body 512 that carries solar energy system 201. Enclosure 225 houses the elements of solar energy system 201, which includes lighting elements 221. The translucent ball enables light to reach solar collectors 215 and photocells 223. Similarly, light from lighting elements 221 illuminates body 512 from within and may create a glowing effect. Of course, body 512 may be attached to string 522 in a myriad of ways, but as illustrated, body 512 is attached at one end of string 522 while the remaining end of string 522 is attached to hanger 524.

Figure 6:
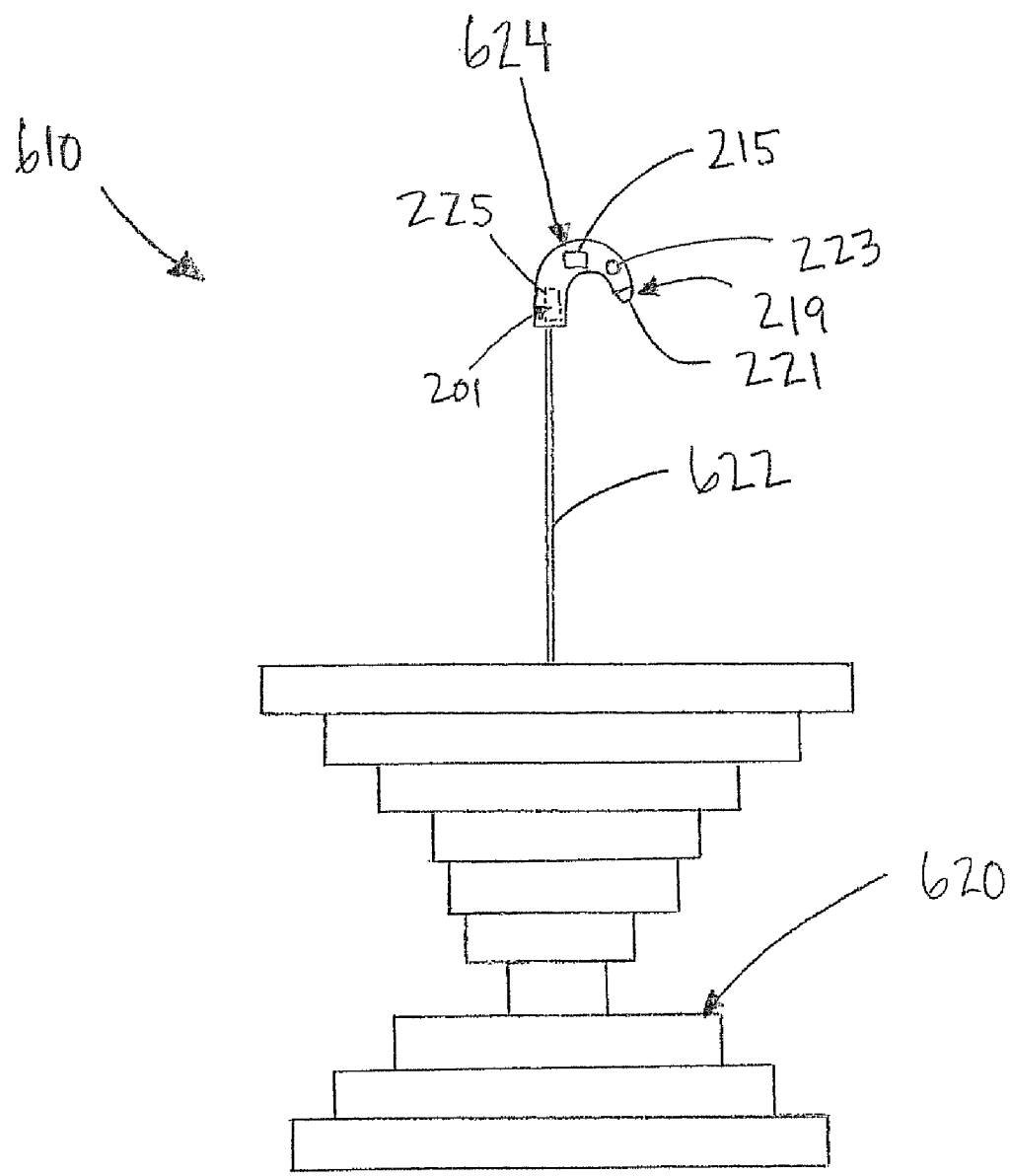
FIG. 6 is a front view of an alternate embodiment of the solar wind chime.

Referring now to FIG. 6 in the drawings, an alternate embodiment of the solar wind chime 10 is illustrated. Solar wind chime 610 includes a hanger 624 which is illustrated as carrying solar energy system 201 and lighting subsystem 219 within and on hanger 624. A decorative hanging element 620, illustrated as a series of interconnected discrete wooden bars organized to create a helical shape is illustrated as being suspended from hanger 624 by a string 622. Lighting elements 221 are illustrated as being located at various locations on and about hanger 624 so as to substantially illuminate decorative hanging element 620. Also, photocell 223 and solar collectors 215 are illustrate as being attached to hanger 624.

Figure 7:
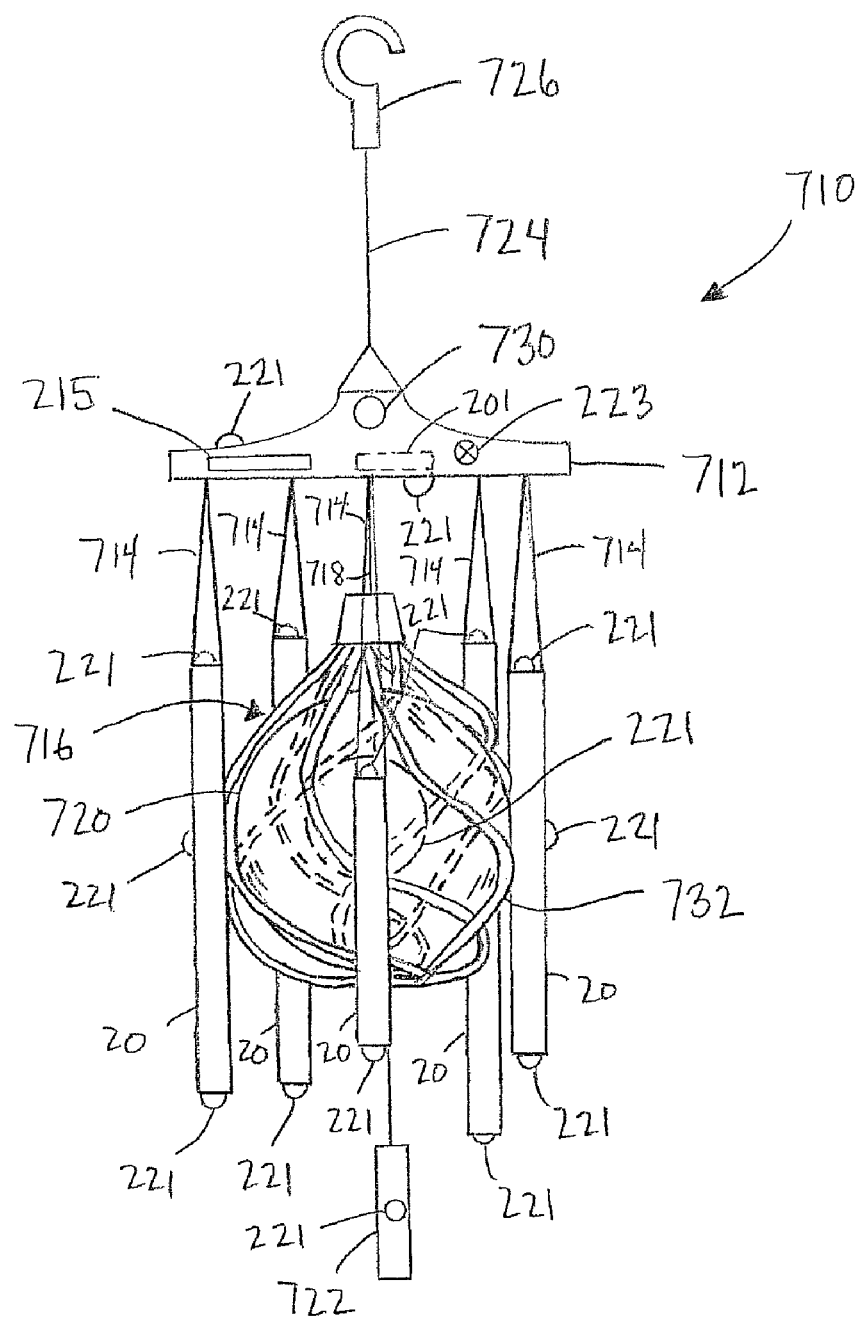
FIG. 7 is an oblique view of an alternative embodiment of the solar wind.

Referring now to FIG. 7 in the drawings, an alternative embodiment of the solar wind chime 10 is illustrated as solar wind chime 710. Solar wind chime 710 includes a body 712, at least one chime 20 supported by body 712 with a string 714, a cage 716 supported by body 712 with a string 718, a decorative object 720 disposed within cage 716, and a pendulum 722 supported by cage 716. As illustrated, body 712 is attached at one end of a string 724 while the remaining end of string 724 is attached to a hanger 726. It should be understood that alternative embodiments may include other suitable devices in lieu of hanger 726 for purposes of attaching solar wind chime 710 to a supporting object (not shown). In addition, it should be understood that strings 714, 718, and 724 may be composed of a wire, a cord, or other suitable materials capable of supporting or providing electrical conductivity from a solar energy system 201 to one or more of the lighting elements 221.

In the illustrated embodiment, body 712 carries solar collector 215, photo cell 223, lighting elements 221, solar energy system 201, and an electrical subsystem 730. It should be understood that that the chimes 20, cage 716, decorative object 720, and pendulum 722 can also include one or more solar collectors 215, photo cells 223, lighting elements 221, solar energy systems 201, and/or electrical subsystems 730.

As illustrated, lighting elements 221 are located at various locations on and about solar wind chime 710 so as to illuminate members of solar wind chime 710. In the illustrated embodiment, at least one of the lighting elements 221 is disposed within decorative object 720 for purposes of illuminating decorative object 720 in a back-lit fashion. In some embodiments, one or more lighting elements 221 can be disposed within, attached outside of, and/or hang from one or more of the chimes 20. In some embodiments, electrical subsystem 730 can include a sound subsystem. The sound subsystem can provide audible chime sounds and be operably associated with photo cell 223 for switching electrical subsystem 730 on and off at predetermined times during the day. In alternative embodiments, sound subsystem may provide instrumental sounds, voice sounds, nature sounds, animal sounds, and combinations thereof.

In the illustrated embodiment, cage 716 comprises a plurality of ribs 732. The ribs 732 can include rigid members suitable for serving dual functions: protecting decorative object 720 and serving as a striker for hitting chimes 20. It should be understood that in alternative embodiments, ribs 732 may be designed in a myriad of decorative configurations. In addition, cage 716 can be an enclosure with perforations of various shapes such as stars, circles, squares, and other designs. In the illustrated embodiment, decorative object 720 is spherical in shape and composed of illuminative and reflective materials, which can include plastic, glass, and/or other such materials that allow at least some light from an internal lighting element 221 to pass therethrough. In alternative embodiments, decorative object 720 may be designed with other shapes such as cubes, cylinders, cones, animals, humans, vehicles, buildings, monuments, and other shapes. In addition, alternative embodiments of decorative object 720 may be composed of materials that are non-reflective and non-illuminative. Alternative embodiments of decorative object 720 can include surfaces that have been painted, embossed, engraved, or covered with adhesive materials, such as a sticker.

Figure 8:
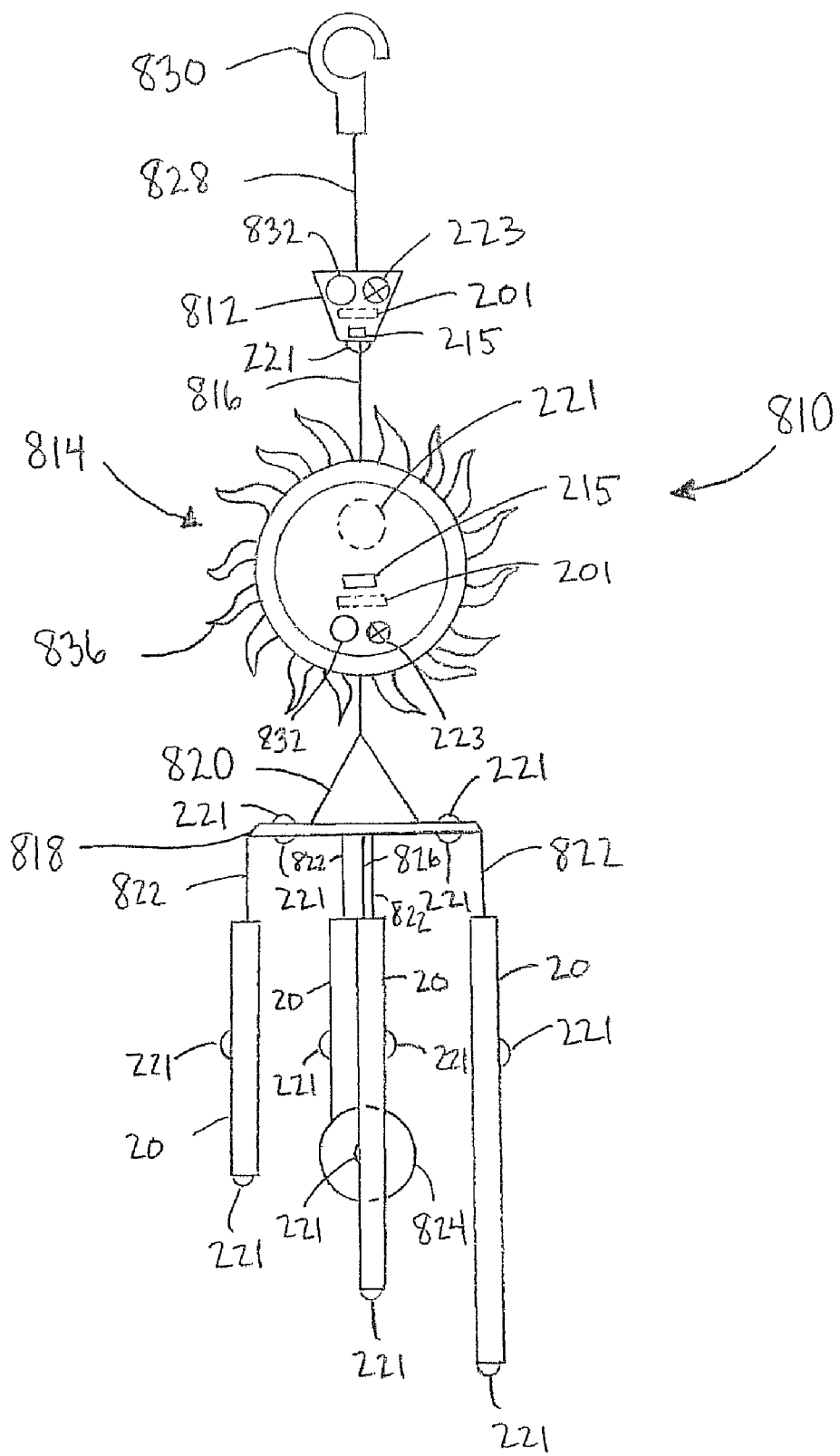
FIG. 8 is an oblique view of an alternative embodiment of the solar wind chime.
Figure 9:
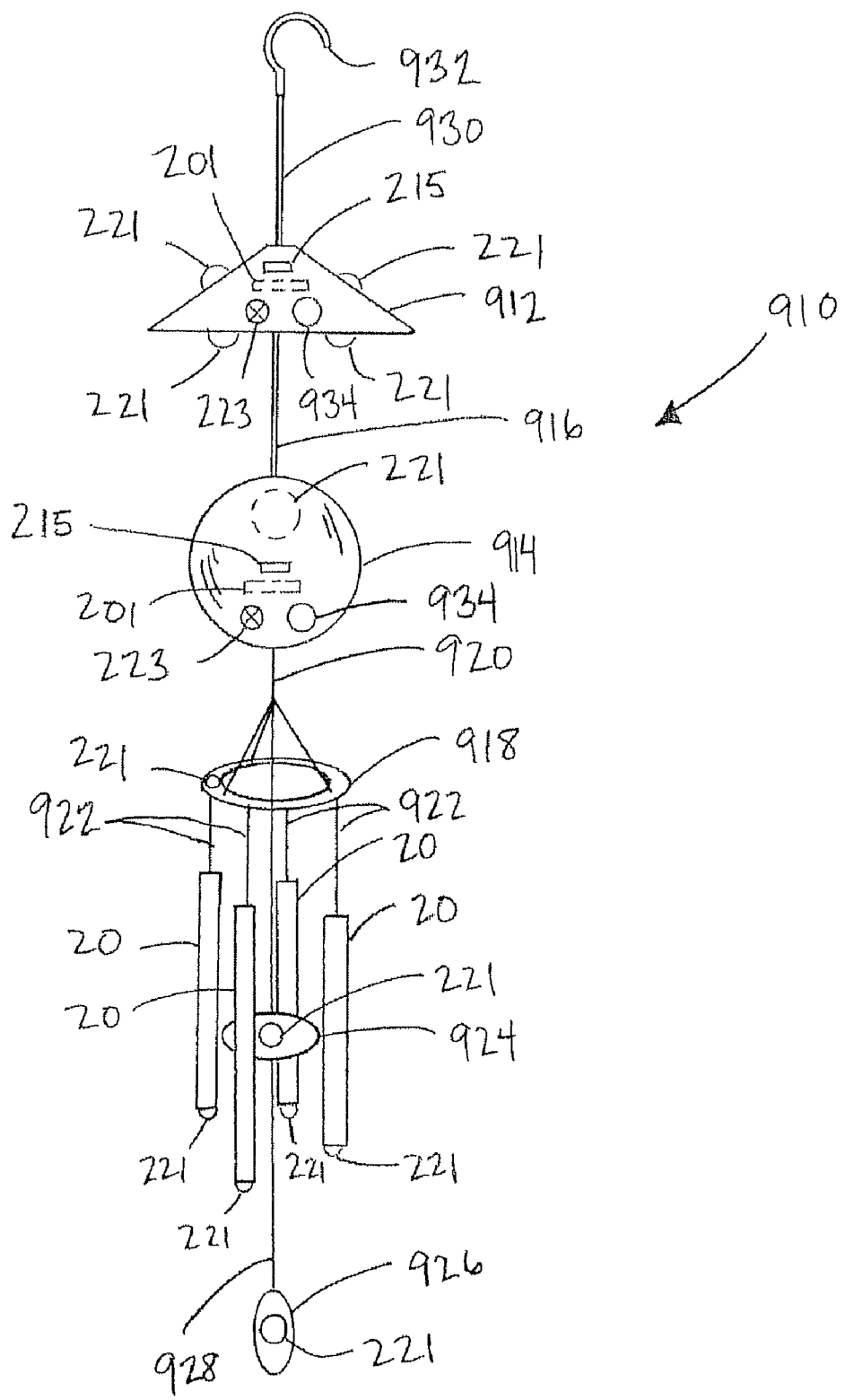
FIG. 9 is an oblique view of an alternative embodiment of the solar wind chime.

In alternative embodiments, body 712 may be supported by an ornamental object, for example as shown in FIGS. 8 and 9. In addition, alternative embodiments may also include decorative elements 320, 420, and 620 as discussed in FIGS. 3, 4, and 6, respectively.

Referring now to FIG. 8 in the drawings, an alternative embodiment of the solar wind chime 10 is illustrated. Solar wind chime 810 is similar to solar wind chime 10 and includes a body 812 substantially similar to body 12 in function. In the illustrated embodiment, solar wind chime 810 has body 812, an ornamental object 814 supported by body 812 with a string 816, a platform 818 supported by ornamental object 814 with a string 820, chimes 20 supported by platform 818 with respective strings 822, and a striker 824 supported by platform 818 with a string 826. As illustrated, body 812 is attached at one end of a string 828 while the remaining end of string 828 is attached to a hanger 830. It should be understood that alternative embodiments may include other devices in lieu of hanger 830 for purposes of attaching solar wind chime 810 to a supporting object (not shown). In addition, it should be understood that one or more of the strings 816, 820, 822, and 826 incorporated with solar wind chime 810 may be composed of a wire, a cord, and/or alternative materials capable of supporting solar wind chime 810 and/or providing electrical conductivity from energy system 201 to an electrical subsystem 832 or lighting element 221.

In the illustrated embodiment, body 812 carries solar collector 215, photo cell 223, lighting element 221, solar energy subsystem 201, and electrical subsystem 832. It should be understood that chime 20, ornamental object 814, platform 818, and striker 824 can also include one or more solar collectors 215, photo cells 223, lighting elements 221, solar energy subsystems 201, and/or electrical subsystems 832. As illustrated, lighting elements 221 are located at various locations on and about solar wind chime 810 so as to illuminate body 812, chime 20, ornamental object 814, platform 818, striker 824, or the combination thereof. In the illustrated embodiment, at least one lighting element 221 is disposed within ornamental object 814 for purposes of illuminating ornamental object 814 in a back-lit fashion.

In some embodiments, electrical subsystem 832 can include a sound subsystem. The sound subsystem can provide audible chime sounds and be operably associated with photo cell 223 for switching electrical subsystem 832 on and off at predetermined times during the day. In some embodiments, sound subsystem may provide instrumental sounds, voice sounds, nature sounds, animal sounds, and combinations thereof.

In the illustrated embodiment, a plurality of projections 836 (only one is marked for simplicity) are coupled to ornamental object 814 and are composed of illuminative and reflective materials. In alternative embodiments, ornamental object 814 may be designed with alternative geometric configurations such as, a spherical, a cubical, a cylindrical, or a conical shape. In addition, ornamental object 814 may be designed to take the shape of animals, humans, vehicles, buildings, monuments, and other shapes. Alternative embodiments of ornamental object 814 may be composed of materials that are non-reflective and non-illuminative. Alternative embodiments of ornament object 814 can include surfaces that have been painted, embossed, engraved, or covered with adhesive materials such as a sticker.

In alternative embodiments, striker 824 may house a decorative object substantially similar to decorative object 720 discussed in FIG. 7 above. In addition, striker 824 may be configured with a plurality of ribs substantially similar to the rib configuration discussed in FIG. 7 above. Alternative embodiments may also include a pendulum or decorative elements 320, 420, and 620 as discussed in FIGS. 3, 4, and 6, respectively.

Referring now to FIG. 9 in the drawings, an alternate embodiment of the solar wind chime 10 is illustrated. Solar wind chime 910 is substantially similar to solar wind chime 810 in form and function. In the illustrated embodiment, solar wind chime 910 has a body 912, an ornamental object 914 supported by body 912 with a string 916, a platform 918 supported by ornamental object 914 with a string 920, chime 20 supported by platform 918 with a string 922, a striker 924 supported by ornamental object 914 with string 920, and a pendulum 926 supported by striker 924 with a string 928. As illustrated, body 912 is attached at one end of a string 930 while the remaining end of string 930 is attached to a hanger 932. It should be understood that alternative embodiments may incorporated other devices in lieu of hanger 932 for purposes of attaching solar wind chime 910 to a supporting object (not shown). In addition, it should be understood that one or more of the strings 916, 920, and 928 incorporated with solar wind chime 910 may be composed of a wire, a cord, and/or alternative materials capable of supporting solar wind chime 910 and/or providing electrical conductivity from energy system 201 to an electrical subsystem 934 or lighting element 221.

In the illustrated embodiment, body 912 carries solar collector 215, photo cell 223, lighting element 221, solar energy subsystem 201, and electrical subsystem 934. It should be understood that chime 20, ornamental object 914, platform 918, striker 924 can also include one or more solar collectors 215, photo cells 223, lighting elements 221, solar energy subsystems 201, and/or electrical subsystems 934. As illustrated, lighting elements 221 are located at various locations on and about solar wind chime 910 so as to illuminate body 912, chime 20, ornamental object 914, platform 918, striker 924, or the combination thereof. In the illustrated embodiment, at least one lighting element 221 is disposed within ornamental object 914 for purposes of illuminating ornamental object 914 in a back-lit fashion. In the illustrated embodiment, ornamental object 914 is spherical in shape and composed of illuminative and reflective materials. In alternative embodiments, ornament object 914 can be composed of non-reflective and non-illuminative materials. In alternative embodiments, ornamental object 914 can include different geometric configurations such as a cubical, a cylindrical, or a conical shape. In addition, ornamental object 814 may be designed to take the shape of animals, humans, vehicles, buildings, monuments, and other shapes. Alternative embodiments of ornament object 914 may include surfaces that have been painted, embossed, engraved, or covered with adhesive materials, such as a sticker.

In alternative embodiments, striker 924 may house a decorative object substantially similar to decorative object 720 discussed in FIG. 7 above. In addition, striker 924 may be configured with a plurality of ribs substantially similar to the rib configuration discussed in FIG. 7 above. Alternative embodiments may also include decorative elements 320, 420, and 620 as discussed in FIGS. 3, 4, and 6, respectively.

Referring now to FIG. 10a in the drawings, a cut-out side view of chime 20 according to the present application is shown. Chime 20 has an inner surface 1010, an opening 1012 and an opening 1014. Chime 20 is supported by a body 1016 with a string 1018 and carries two brackets 1020 that are coupled to inner surface 1010. A wire 1022 is supported by brackets 1020 and provides electrical conductivity from energy system 201 to a lighting element 221. In some embodiments, the wire 1022 can freely slide through the brackets 1020, but the wire 1022 is supported in that the wire 1022 is laterally supported so as to prevent the wire 1022 from making contact with the inner surface 1010. In some embodiments, the wire 1022 can be longitudinally supported by the brackets 1020 such that the wire 1022 cannot easily slide through the brackets 1020. For example, in embodiments such as the one shown in FIG. 10a, the wire 1022 can be pulled taught between the brackets 1020 and kept taught by the brackets 1020 since the wire 1022 cannot easily pass through the brackets 1020. This type of longitudinal support can be accomplished in a number of ways, for example by providing a pass-through opening in the brackets 1020 that at least somewhat pinches or attaches to the wire 1022. It should be understood that in alternative embodiments, the number of brackets used is not limited to two brackets 1020. Any number of brackets 1020 can be used and spaced apart as required such that wire 1022 does not come in contact with inner surface 1010. In alternative embodiments, brackets 1020 may be positioned at openings 1012, 1014. In addition, brackets 1020 may be positioned such that lighting element 221 can be disposed within chime 20.

Referring now to FIGS. 10b-d in the drawings, three different embodiments of bracket 1020 are shown. FIGS. 10b-d show respective top views of the chime 20. In FIG. 10b, a cantilevered bracket 1024 is shown coupled to inner surface 1010 of chime 20. Bracket 1024 has an opening 1026 that passes through bracket 1024 for passage of wire 1022 (not shown). In FIG. 10c, a bridged bracket 1028 is shown coupled to inner surface 1010 of chime 20. Bracket 1028 has an opening 1030 that passes through bracket 1028 for passage of wire 1022 (not shown). In FIG. 10d, a cantilevered bracket 1032 is shown coupled to inner surface 1010 of chime 20. Bracket 1032 has a clip 1034 for attaching wire 1022 (not shown). It should be understood that other configurations for bracket 1020 can be used for spacing the wire from the inner surface 1010 of the chime 20.

The present application provides significant advantages, including: (1) an unique cage that protects a decorative object and serves as a striker for hitting a chime; (2) an ornamental object configured for illuminating the wind chime members; and (3) a bracket disposed within the chime for carrying a wire through the chime such that the wire does not come into contact with the chime's inner surface.

While this invention has been described with reference to an illustrative embodiment, this description is not intended to be construed in a limiting sense. Various modifications and other embodiments of the invention will be apparent to persons skilled in the art upon reference to the description.

What is claimed is:

1. A solar wind chime, comprising:
a structure having:
a body; and
a chime supported by the body, the chime extending a length, the chime having:
an inner surface; and
a bracket coupled to the inner surface of the chime;
an electrical subsystem supported by the structure;
a solar energy system conductively coupled to the electrical subsystem, the solar energy system comprising:
a rechargeable electrical power source; and
a solar energy collection system conductively coupled to the rechargeable electrical power source for recharging the rechargeable electrical power source; and
a wire for providing electrical power from the power source to at least a portion of the electrical subsystem, the wire extends the whole length of the chime, and the wire configured to support the electrical subsystem,
wherein the wire is at least partially supported by the bracket.

2. The solar wind chime according to claim 1, wherein the electrical subsystem includes a lighting element, wherein the wire is for providing electrical power from the power source to the lighting element.

3. The solar wind chime according to claim 2, wherein the lighting element is supported by the wire.

4. The solar wind chime according to claim 2, wherein the structure further comprises:
a cage supported by the body; and
a decorative object disposed within the cage.

5. The solar wind chime according to claim 4, wherein the electrical subsystem further comprises a lighting element disposed within the cage.

6. The solar wind chime according to claim 4, wherein the decorative object is composed of translucent material.

7. The solar wind chime according to claim 1, wherein the chime further includes a second bracket coupled to the inner surface of the chime, wherein the wire is at least partially supported by the second bracket.

8. The solar wind chime according to claim 1, wherein the wire is at least partially supported by the bracket such that the wire is prevented from contacting the inner surface of the chime.

9. The solar wind chime according to claim 1, wherein the bracket includes an opening, and wherein the wire extends through the opening in the bracket.

10. The solar wind chime according to claim 1, wherein the bracket includes a clip for securing the wire.

11. The solar wind chime according to claim 1, wherein the bracket extends across the inside of the chime.

12. A solar wind chime, comprising:
an ornamental object;
a platform supported by the ornamental object;
a chime supported by the platform, the chime extending a length, the chime having:
   an inner surface; and
   a bracket extending from the inner surface;
an electrical subsystem supported by the wind chime structure, the electrical subsystem having at least one lighting element supported by the platform;
a solar energy system conductively coupled to the electrical subsystem, the solar energy system comprising:
   a rechargeable electrical power source; and
   a solar energy collection system conductively coupled to the rechargeable electrical power source for recharging the rechargeable electrical power source; and
a wire conductively coupled to the solar energy system and the electrical subsystem, the wire being disposed within the chime and extends the whole length therein, and the wire also being supported within the chime by the bracket.

13. The solar wind chime according to claim 12, further comprising a striker supported by the ornamental object.

14. The solar wind chime according to claim 13, wherein the striker houses a decorative object.

15. The solar wind chime according to claim 12, further comprising a body for supporting the ornamental object.

16. The solar wind chime according to claim 15, wherein the electrical subsystem further comprises a lighting element carried by the body for illuminating the ornamental object in a front-lit fashion.

17. The solar wind chime according to claim 12, wherein the ornamental object comprises translucent material.

18. The solar wind chime according to claim 12, wherein the at least one lighting element is disposed within the ornamental object.

19. The solar wind chime according to claim 12, wherein the at least one lighting element is supported by the wire.

* * * * *